United States Patent [19]

Saito

[11] 3,853,312

[45] Dec. 10, 1974

[54] FIXING STRUCTURE OF PLASTIC MEMBER

[75] Inventor: Toshiaki Saito, Suwa, Japan

[73] Assignee: Kabushiki Kaisha Suwa Seikosha, Tokyo, Japan

[22] Filed: June 28, 1971

[21] Appl. No.: 157,514

[30] Foreign Application Priority Data
June 27, 1970  Japan.............................. 45-63480

[52] U.S. Cl. .............................................. 267/152
[51] Int. Cl............................................... F16f 3/08
[58] Field of Search ........... 267/152, 153, 140, 141, 267/63

[56] References Cited
UNITED STATES PATENTS
3,181,849  5/1965  Mitchell............................. 267/140

3,610,610  10/1971  Chassagne ........................... 267/157

Primary Examiner—James B. Marbert
Attorney, Agent, or Firm—Blum Moscovitz Friedman & Kaplan

[57]  ABSTRACT

The use of a plastic member having resiliently compressible portions in combination with rigid pillars of precise length makes it possible to position watch components relative to each other with high precision. The structure is particularly suitable for spacing a bridge and a plate in a watch which is other than stem-wound.

2 Claims, 1 Drawing Figure

PATENTED DEC 10 1974
3,853,312
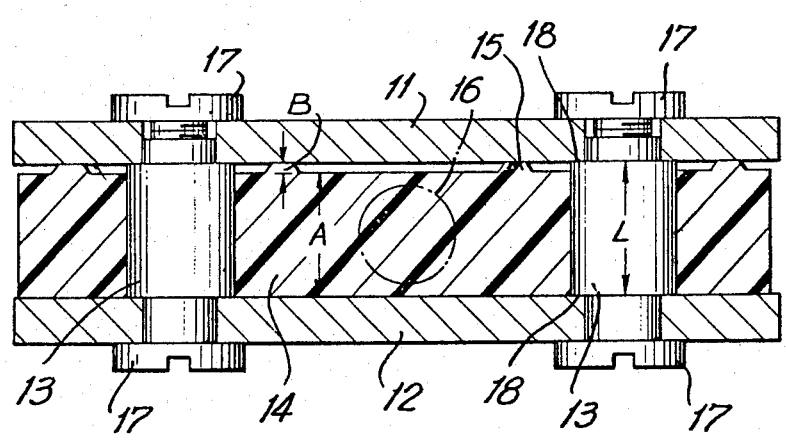

FIXING STRUCTURE OF PLASTIC MEMBER

BACKGROUND OF THE INVENTION

In low priced watches, a bridge and a plate, made of relatively thin sheet, are spaced apart by a number of pillars. Wheels and gears are supported between the bridge and the plate. Where the watch is to be stem-wound, a stem-block is also positioned between the bridge and the plate. To control costs, the stem-block is generally held by the same pillars and screws which hold the bridge to the plate. If the spacing between the bridge and the plate as set by the pillars is greater than the thickness of the stem-block, then the positioning of the stem-block is indefinite. Contrariwise, if the thickness of the stem-block is greater than the length of the pillars then the spacing of the bridge from the plate depends on the precision with which the stem-block is made. Since it is difficult and consequently costly to control the thickness of the stem-block to the same precision with which the length of the pillars can readily be controlled, this arrangement is also unsatisfactory.

SUMMARY OF THE INVENTION

With the advent of watches which are no longer stem-wound, such as battery-driven watches, it becomes possible to construct stem-blocks of materials less rigid than those previously used. Using a resilient plastic, a stem-block is prepared having projections conferring compressibility thereon. The thickness of the stem-block is initially slightly greater than the length of pillars to be used in assembly of a plate to a bridge. The plate and the bridge are urged toward each other by screws until they bottom on pillars. In the process of assembly, the projections on the stem-block are compressed, thereby firmly locating the stem-block within the assembly.

Accordingly, an object of the invention is to space apart with high precision the bridge and plate of a watch while holding a stem-block firmly therebetween.

Another object of the invention is to space apart a bridge and plate of a watch with high precision and at low cost while holding a stem-block firmly therebetween.

Still another object of the invention is to provide a stem-block for watches which are other than stem-wound.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE shows a plate and a bridge of a watch spaced apart by pillars and holding a stem-block in accordance with the present invention.

DESCRIPTION OF THE PREFERRED EMBODIMENT

A plastic block having projections and being dimensioned in accordance with the present invention is suitable for use in an instrument where elements thereof are spaced apart by pillars. A watch is such an instrument L which, as shown in FIG. 1, the spaced-apart elements are a bridge 11 and a plate 12. The pillars 13 have shoulders 18 against which the bridge 11 and the plate 12 are held by screws 17. Plastic block 14 holds a stem at the location indicated by the lead line 16 and has projections 15 thereon. The length of the pillar 13 between the shoulders 18, 18 can vary between 1 and $L + \Delta L$, depending on the precision with which the pillars are made or selected. The block 14 which must be of a resilient plastic must be of a thickness at the location indicated by A not exceeding L. Furthermore, the height of the projections 15 prior to compression between the bridge and the plate must be such that the thickness A plus the height of the projection (B) exceeds the maximum length of the pillar 13 between the shoulders 18, 18, or in other words, must exceed L plus $\Delta L$. Finally, the resilience of the plastic block 14 and the projection 15 must be such that the block and the projection can be compressed into a total height not exceeding L. Under these conditions, a bridge 11 and a plate 12 will engage a block 14 even when the length of a pillar 13 is as great as L plus $\Delta L$, and the block 14 with its projection 15 will permit the bridge 11 and the plate 12 to seat on the pillars 13 even when the length of the pillars between shoulders 18, 18 is no greater than L. Moreover, the objectives are achieved without the use of separate pillars and screws to hold the stem-block. In the case of an electric instrument other than a watch or in an electric watch a coil block can be held in the plastic block 14 in similar fashion.

However, the invention can be applied where the distance between the plate and the bridge is determined by a recess or a hollow.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention here described, and all statements of the scope of the invention which, as a matter of language, might be said to fall therebetween.

What is claimed is:

1. An improvement in an instrument having elements spaced apart by pillars having a length lying in the range between L and $L + \Delta L$, comprising a block of a resilient plastic for insertion between said elements, said block having a thickness not greater than L and having thereon at least one projection of length such that the thickness of said plastic element plus the length of said projection exceeds $L + \Delta L$, said projection being compressible to an extent such that the thickness of said block plus the thickness of said projection does not exceed L.

2. An improvement in an instrument having elements spaced apart by a member having a length lying in the range between L and L + $\Delta$L, comprising a block of a resilient plastic for insertion between said elements, said block having a thickness not greater than L and having thereon at least one projection of length such that the thickness of said plastic element plus the length of said projection exceeds L + $\Delta$L, said projection being compressible to an extent such that the thickness of said block plus the thickness of said projection does not exceed L.

* * * * *